(12) United States Patent
Feng

(10) Patent No.: US 10,353,498 B2
(45) Date of Patent: Jul. 16, 2019

(54) TOUCH STRUCTURE FOR TOUCH DISPLAY PANEL

(71) Applicant: Wuhan China Star Optoelectronics Semiconductor Display Technology Co., Ltd., Wuhan, Hubei (CN)

(72) Inventor: Xiaoliang Feng, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/911,404

(22) Filed: Mar. 5, 2018

(65) Prior Publication Data

US 2019/0179439 A1    Jun. 13, 2019

Related U.S. Application Data

(63) Continuation of application No. PCT/CN2018/073344, filed on Jan. 19, 2018.

(30) Foreign Application Priority Data

Dec. 8, 2017 (CN) .......................... 2017 1 1291259

(51) Int. Cl.
   *G06F 3/041*   (2006.01)
(52) U.S. Cl.
   CPC .... *G06F 3/041* (2013.01); *G06F 2203/04101* (2013.01); *G06F 2203/04103* (2013.01)

(58) Field of Classification Search
   CPC .......... G06F 3/041; G06F 3/045; G01R 27/26
   See application file for complete search history.

(56) References Cited

U.S. PATENT DOCUMENTS

| 9,244,573 | B2 * | 1/2016 | Ryu ........................ G06F 3/044 |
| 2014/0184939 | A1 * | 7/2014 | Lai .......................... G06F 3/044 349/12 |
| 2015/0001060 | A1 * | 1/2015 | Kim ....................... G06F 3/044 200/600 |
| 2017/0153744 | A1 * | 6/2017 | Kang .................... G06F 3/0416 |

(Continued)

FOREIGN PATENT DOCUMENTS

| CN | 202771396 U | 3/2013 |
| CN | 203178996 U | 9/2013 |

(Continued)

*Primary Examiner* — Pegeman Karimi
(74) *Attorney, Agent, or Firm* — Hauptman Ham, LLP

(57) ABSTRACT

A touch structure for touch display pane includes a plurality of first sensing strip, each of first sensing strips is extending along first direction and first sensing strips are parallel to each other and separately positioned, each of first sensing strips comprises a plurality of first sensing pad and a plurality of first bridge connector connecting in cascade with first sensing pads; a plurality of second sensing strip, each of second sensing strips is extending along second direction which is perpendicular to first direction and second sensing strips are parallel to each other and separately positioned, each of second sensing strips comprises a plurality of second sensing pad and a plurality of second bridge connector connecting in cascade with second sensing pads, second bridge connector is insulating with first bridge connector.

5 Claims, 4 Drawing Sheets

(56) References Cited

U.S. PATENT DOCUMENTS

2018/0120998 A1* 5/2018 Jeong .................... G06F 3/0412
2018/0366520 A1* 12/2018 Gwon ................... H01L 27/323

FOREIGN PATENT DOCUMENTS

| CN | 103412689 A | 11/2013 |
| CN | 103927031 A | 7/2014 |
| CN | 105117067 A | 12/2015 |

* cited by examiner

TOUCH STRUCTURE FOR TOUCH DISPLAY PANEL

RELATED APPLICATIONS

The present application is a National Phase of International Application Number PCT/CN2018/073344, filed Jan. 19, 2018, and claims the priority of China Application No. 201711291259.6, filed Dec. 8, 2017.

FIELD OF THE DISCLOSURE

The disclosure relates to a touch display technical field, and more particularly to a touch structure for touch display panel.

BACKGROUND

Touch panels are input devices on which users may use fingers or object to select images shown on the display devices by contacting the display devices so as to input instructions. As such, the touch panels may replace the independent input devices, such as keyboards or mouse connecting to the display devices, and thus have been widely adopted.

Traditional touch panel includes touch structure, the touch structure includes a plurality of sensing strip in X direction and a plurality of sensing strip in Y direction. Wherein, each of the sensing strips in X direction and each of the sensing strips in Y direction comprise a plurality sensing pad such that could accuracy sensing the user touch position. Intersection position of the sensing strips in X direction and the sensing strips in Y direction is using a bridge connector for connecting two adjacent sensing pads. But, the connection way by the single bridge connector is easy to broke during manufacturing method because of the bridge connector is more and more tiny with high accuracy requirement of the touch panel. If the bridge connector broken, it will causes whole sensing strips cannot conducting such that failure the touch function.

SUMMARY

A technical problem to be solved by the disclosure is to provide a touch structure for touch display panel with increased connection yield of bridge connector.

An objective of the disclosure is achieved by following embodiments. In particular, a touch structure for touch display panel includes a plurality of first sensing strip, each of the first sensing strips is extending along a first direction and the plurality of the first sensing strip are parallel to each other and separately positioned, each of the first sensing strips comprises a plurality of first sensing pad and a plurality of first bridge connector connecting in cascade with the plurality of first sensing pad, two adjacent the first sensing pads of each of the first sensing strips connected in cascade with at least two of the first bridge connectors; a plurality of second sensing strip, each of the second sensing strips is extending along a second direction which is perpendicular to the first direction and the plurality of the second sensing strip are parallel to each other and separately positioned, each of the second sensing strips comprises a plurality of second sensing pad and a plurality of second bridge connector connecting in cascade with the plurality of second sensing pad, two adjacent the second sensing pads of each of the first sensing strips connected in cascade with at least two of the second bridge connectors; wherein each of the second sensing strips is across to the plurality of the first sensing strips, each of the second bridge connectors is across all of the first bridge connectors which are positioned between two adjacent correspondingly the first sensing pads, and the second bridge connector is insulating with the first bridge connector.

In an embodiment, the first sensing pad and/or the second sensing pad is octagon.

In an embodiment, the first sensing pad has a first groove and a second groove are parallel to each other, the first groove and the second groove are pass through two opposite sides of the same octagon.

In an embodiment, in each of the first sensing strips, part of two adjacent first sensing pads which located between the first groove and the second groove is connecting in cascade with the first bridge connector, part of two adjacent first sensing pads which located on a side of the first groove which backward to the second groove is connecting in cascade with the first bridge connector, part of two adjacent first sensing pads which located on a side of the second groove which backward to the first groove is connecting in cascade with the first bridge connector.

In an embodiment, the first sensing pad has a first channel and a second channel are opened along a first side of the octagon and the first channel and the second channel are parallel to each other, and a third channel and a fourth channel are opened along a second side of the octagon and the third channel and the fourth channel are parallel to each other, the first side is opposite to the second side, extending direction of the first channel and the third channel are coincidence and independent, extending direction of the second channel and the fourth channel are coincidence and independent.

In an embodiment, the first sensing pad has a fifth channel and a sixth channel are opened along a third side of the octagon and the fifth channel and the sixth channel are parallel to each other, and a seventh channel and an eighth channel are opened along a fourth side of the octagon and the seventh channel and the eighth channel are parallel to each other, the third side is opposite to the fourth side, and the third side is not connecting with the first side and the second side, the fourth side is not connecting with the first side and the second side, extending direction of the fifth channel and the seventh channel are coincidence and independent, extending direction of the sixth channel and the eighth channel are coincidence and independent.

In an embodiment, the first sensing pad further comprises a first bending groove, a second bending groove, a third bending groove and a fourth bending groove are array arrangement, the first bending groove, the second bending groove, the third bending groove and the fourth bending groove are L-shaped, and bending sites of the first bending groove, the second bending groove, the third bending groove and the fourth bending groove are corresponding to each other.

In an embodiment, the first bending groove is corresponding to the first channel, and extending direction of one groove of the first bending groove is coincidence to extending direction of the first channel, extending direction of another groove of the first bending groove is coincidence to extending direction of the fifth channel; the second bending groove is corresponding to the second channel, and extending direction of one groove of the second bending groove is coincidence to extending direction of the second channel, extending direction of another groove of the second bending groove is coincidence to extending direction of the seventh channel; the third bending groove is corresponding to the third channel, and extending direction of one groove of the third bending groove is coincidence to extending direction of the third channel, extending direction of another groove of the third bending groove is coincidence to extending direction of the sixth channel; the fourth bending groove is corresponding to the fourth channel, and extending direction of one groove of the fourth bending groove is coincidence to extending direction of the fourth channel, extending direction of another groove of the fourth bending groove is coincidence to extending direction of the eighth channel.

In an embodiment, in each of the first sensing strips, part of two adjacent first sensing pads which located between the first channel and the second channel is connecting in cascade with the first bridge connector, part of two adjacent first sensing pads which located on a side of the first channel which backward to the second channel is connecting in cascade with the first bridge connector, part of two adjacent first sensing pads which located on a side of the second channel which backward to the first channel is connecting in cascade with the first bridge connector.

In an embodiment, the first sensing pad and the second sensing pad have same structures.

In sum, according to the embodiments of this disclosure, using multiple bridge connectors connecting in cascade with adjacent sensing pads could effective decrease risk of the broken circuit such that enhance connection yield of bridge connector. In addition, the small area design of the sensing pad could also enhances sensitivity of the touch reaction such increases user experience. Further, providing multiple pattern structures sensing pad is beneficial to product diversification.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
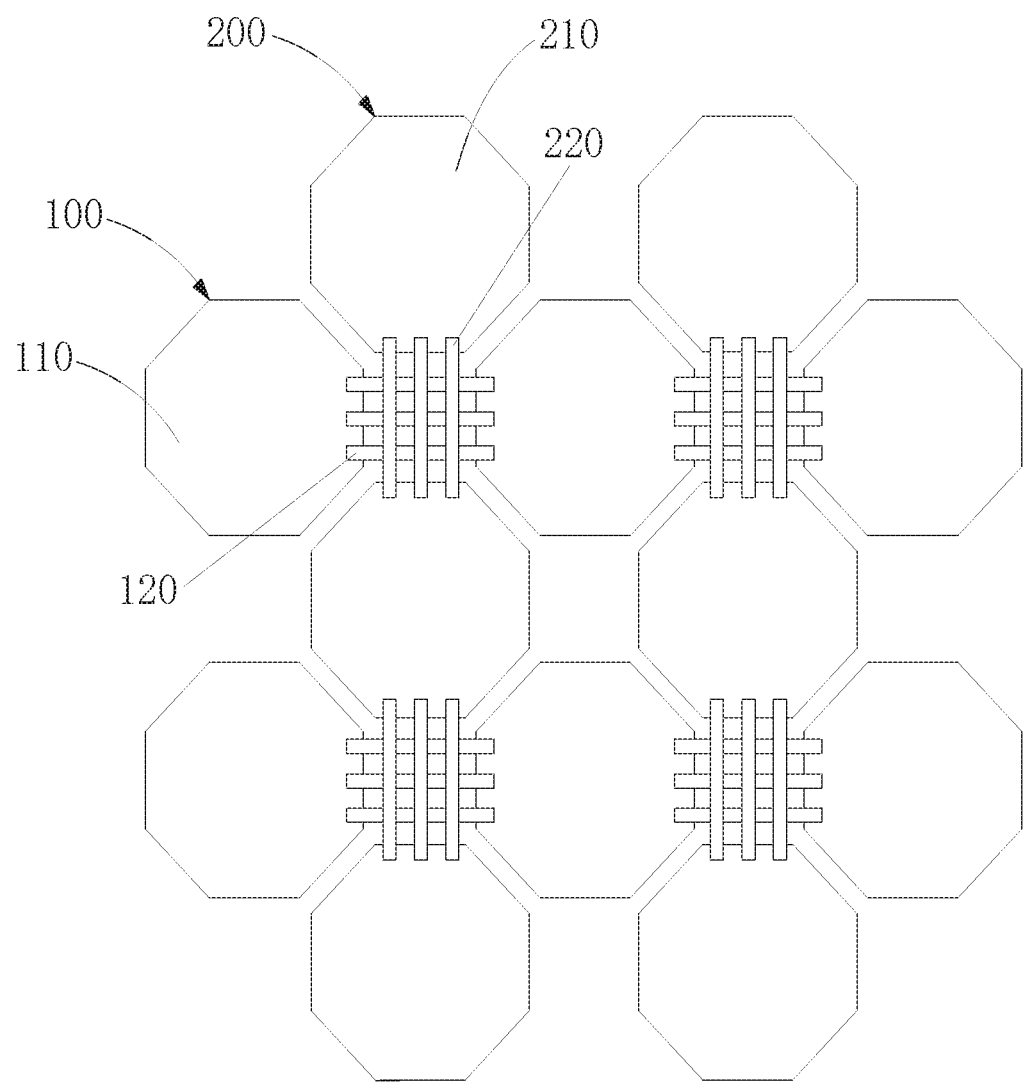
FIG. 1 is a structural schematic view of a touch structure for touch display panel according to an embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the drawings, the same reference numerals will be used throughout to designate the same of like elements. It will be understood that, although the terms first, second, etc. may be used hereinto describe various elements, these elements should not be limited by these terms. There terms are only used to distinguish one element from another.

FIG. 1 is a structural schematic view of a touch structure for touch display panel according to an embodiment of the disclosure.

Please refer to FIG. 1, the touch structure for touch display panel of the embodiment in this disclosure includes a plurality of first sensing strip 100 and a plurality of second sensing strip 200.

Each of the first sensing strips 100 is extending along a first direction (which is X direction or horizontal direction) and the plurality of the first sensing strip 100 are parallel to each other and separately positioned. In another words, two adjacent the first sensing strips 100 are parallel to each other and does not connecting to each other in a second direction which is perpendicular to the first direction. Each of the first sensing strips 100 comprises a plurality of first sensing pad 110 and a plurality of first bridge connector 120 connected in cascade with the plurality of first sensing pad 110, two adjacent the first sensing pads 110 of each of the first sensing strips 100 is connected in cascade with three the first bridge connectors 120. It is noted that, the number of the first sensing strips 100 and the first sensing pads 110 is not be limited, there could be adjustment and positioned according to realistic. In addition, the number of the first bridge connectors 120 which connecting in cascade with two adjacent the first sensing pads 110 of each of the first sensing strips 100 is also not be limited for three, it also could be two, four or more first bridge connectors 120.

Each of the second sensing strips 200 is extending along a second direction (which is Y direction or vertical direction) and the plurality of the second sensing strip 200 are parallel to each other and separately positioned. In another words, two adjacent the second sensing strips 200 are parallel to each other and does not connecting to each other in a first direction. Each of the second sensing strips 200 comprises a plurality of second sensing pad 210 and a plurality of second bridge connector 220 connected in cascade with the plurality of second sensing pad 220, two adjacent the second sensing pads 220 of each of the second sensing strips 200 is connected in cascade with three the second bridge connectors 220. It is noted that, the number of the second sensing strips 200 and the second sensing pads 210 is not be limited, there could be adjustment and positioned according to realistic. In addition, the number of the second bridge connectors 220 which connecting in cascade with two adjacent the second sensing pads 220 of each of the second sensing strips 200 is also not be limited for three, it also could be two, four or more second bridge connectors 220

In this embodiment, the first sensing pad 110 and the second pad 210 are located in the same layer, the first sensing pad 110 and the second pad 210 are separated to each other. In addition, the first bridge connector 120 and the second bridge connector 220 are insulating to each other, for example, positioning an insulating body on the overlapping position of the first bridge connector 120 and the second bridge connector 220 for keeping the first bridge connector 120 and the second bridge connector 220 are insulating to each other.

Therefore, in whole view, each of the second sensing strips 200 is across to the plurality of the first sensing strips 100, each of the second bridge connectors 220 is across three of the first bridge connectors 120 which are between two adjacent correspondingly the first sensing pads 110.

In this embodiment, while touch operation, the first sensing strip 100 could be an emitting electrode (which is Tx electrode), the second sensing strip 200 could be a receiving electrode (which is Rx electrode). But here is not limited thereto. For example, the first sensing strip 100 could be a receiving electrode, and the second strip 200 could be an emitting electrode.

In addition, in this embodiment, the shape of the first sensing pad 110 and the second sensing pad 210 are octagon, but here is not limited thereto. For example, shape of the first sensing pad 110 and/or the second sensing pad 210 could be rhombus, trapezoidal, cruciform, triangular, regular hexagon, regular pentagon, square or other suitable shape.

Here, using three bridge connectors connecting in cascade with adjacent sensing pads could effective decrease risk of the broken circuit such that enhance connection yield of bridge connector.

Figure 2:
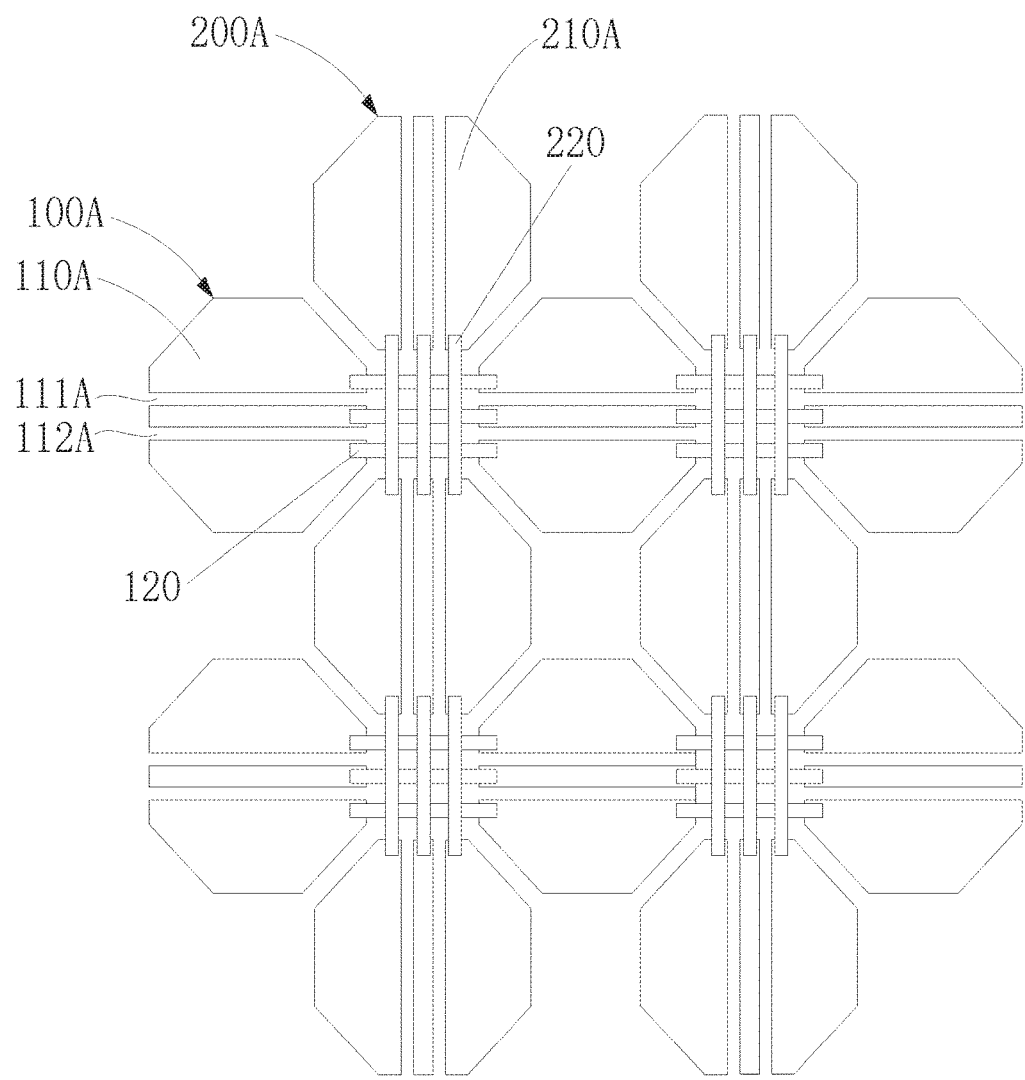
FIG. 2 is a structural schematic view of a touch structure for touch display panel according to another embodiment of the disclosure.

FIG. 2 is a structural schematic view of a touch structure for touch display panel according to another embodiment of the disclosure.

Please refer to FIG. 2, the difference between the FIG. 1 is that, in this embodiment, structure of the first sensing pad 110A and the second sensing pad 210A shows in FIG. 2 is difference between structure of the first sensing pad 110 and the second sensing pad 210 shows in FIG. 1.

Specifically, the first sensing pad 110A and the second sensing pad 210A have same structure, therefore here only illustrates the first sensing pad 110A.

Each of the first sensing pad 110A has a first groove 111A and a second groove 112A are parallel to each other, the first groove 111A and the second groove 112A are pass through two opposite sides of the same octagon. Therefore, here could separate the first sensing pad 110A for three parts by the first groove 111A and the second groove 112A, which is the part of located between the first groove 111A and the second groove 112A, part of located on a side of the first groove 111A which backward to the second groove 112A, part of located on a side of the second groove 112A which backward to the first groove 111A.

While two adjacent the first sensing pads 110A of each of the first sensing strip 100A are connected in cascade, using one of the first bridge connector 120 connecting in cascade with part of two adjacent first sensing pads 110A which located between the first groove 111A and the second groove 112A. And using another the first bridge connector 120 connecting in cascade with part of two adjacent first sensing pads 110A which located on one side of the first groove 111A which backward to the second groove 112A. And using another the first bridge connector 120 connecting in cascade with part of two adjacent first sensing pads 110A which located on one side of the second groove 112A which backward to the first groove 111A.

Figure 3:
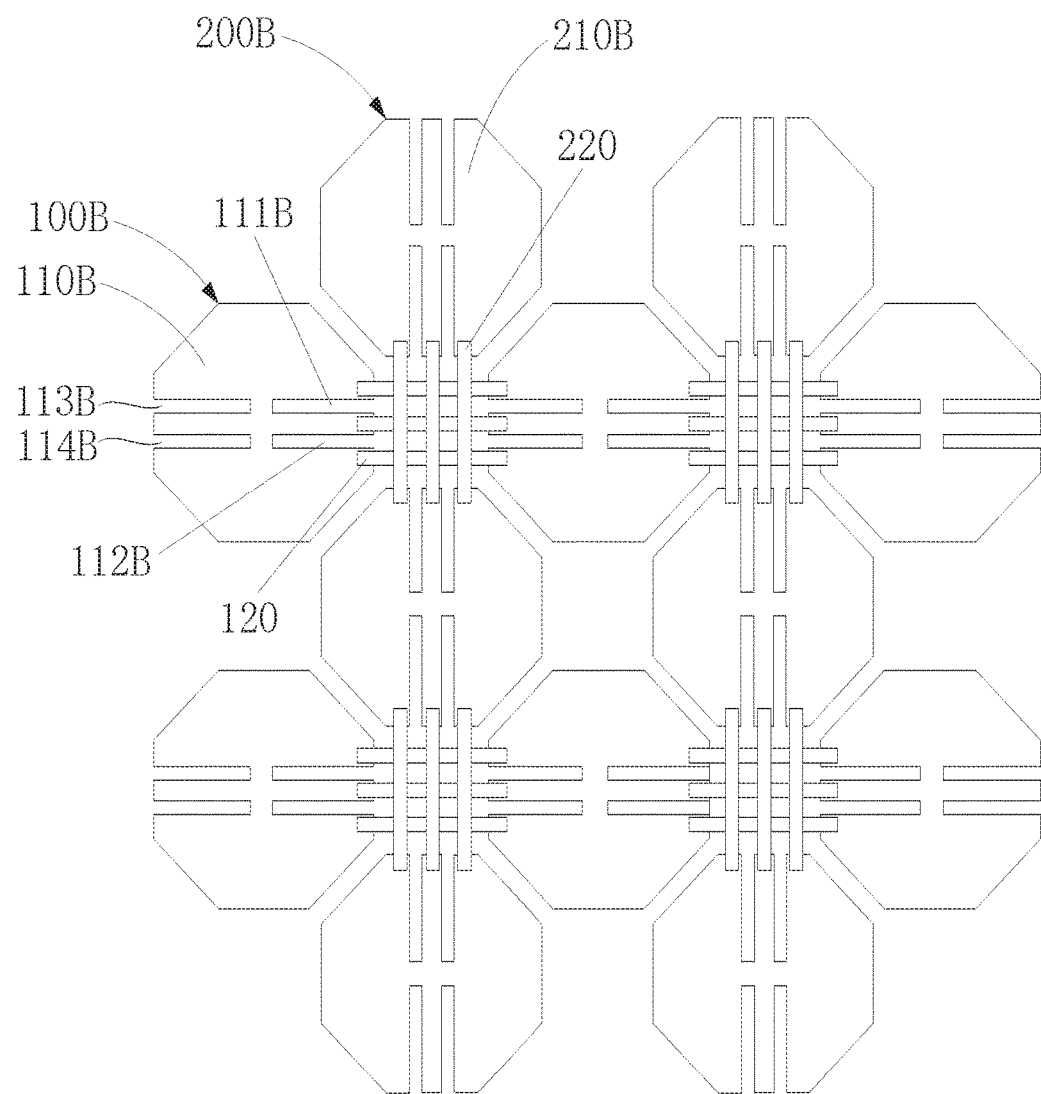
FIG. 3 is a structural schematic view of a touch structure for touch display panel according to further another embodiment of the disclosure.

FIG. 3 is a structural schematic view of a touch structure for touch display panel according to further another embodiment of the disclosure.

Please refer to FIG. 3, the difference between the FIG. 1 is that, in this embodiment, structure of the first sensing pad 110B and the second sensing pad 210B shows in FIG. 3 is difference between structure of the first sensing pad 110 and the second sensing pad 210 shows in FIG. 1.

Specifically, the first sensing pad 110B and the second sensing pad 210B have same structure, therefore here only illustrates the first sensing pad 110B.

Each of the first sensing pad 110B has a first channel 111B and a second channel 112B are opened along a first side of the octagon and the first channel 111B and the second channel 112B are parallel to each other. And a third channel 113B and a fourth channel 114B are opened along a second side of the octagon and the third channel 113B and the fourth channel 114B are parallel to each other. The extending direction of the first channel 111B and the third channel 113B are coincidence and independent, extending direction of the second channel 112B and the fourth channel 114B are coincidence and independent. Therefore, on the first side of the octagon, separate the first sensing pad 110B for three parts by the first groove 111B and the second groove 112B, which is the part of located between the first groove 111B and the second groove 112B, part of located on a side of the first groove 111B which backward to the second groove 112B, part of located on a side of the second groove 112B which backward to the first groove 111B; on the second side of the octagon, separate the first sensing pad 110B for three parts by the third groove 113B and the fourth groove 114B, which is the part of located between the third groove 113B and the fourth groove 114B, part of located on a side of the third groove 113B which backward to the fourth groove 114B, part of located on a side of the fourth groove 114B which backward to the third groove 113B.

Connection way of one lateral of the first side as same as connection way of one lateral of the second side of the octagon first sensing pad 110B. Therefore, only illustrates connection way of one side of the first side of the octagon first sensing pad 110 below.

While two adjacent the first sensing pad 110B of each of the first sensing strip 100B are connected in cascade, using one of the first bridge connector 120 connecting in cascade with part of two adjacent first sensing pads 110B which located between the first groove 111B and the second groove 112B (or connecting in cascade with part of two adjacent first sensing pads 110B which located between the third groove 113B and the fourth groove 114B). And using another the first bridge connector 120 connecting in cascade with part of two adjacent first sensing pads 110B which located on one side of the first groove 111B which backward to the second groove 112B (or connecting in cascade with part of two adjacent first sensing pads 110B which located on one side of the third groove 113B which backward to the fourth groove 114B). And using another the first bridge connector 120 connecting in cascade with part of two adjacent first sensing pads 110B which located on one side of the second groove 112B which backward to the first groove 111B (or connecting in cascade with part of two adjacent first sensing pads 110B which located on one side of the fourth groove 114B which backward to the third groove 113B).

Figure 4:
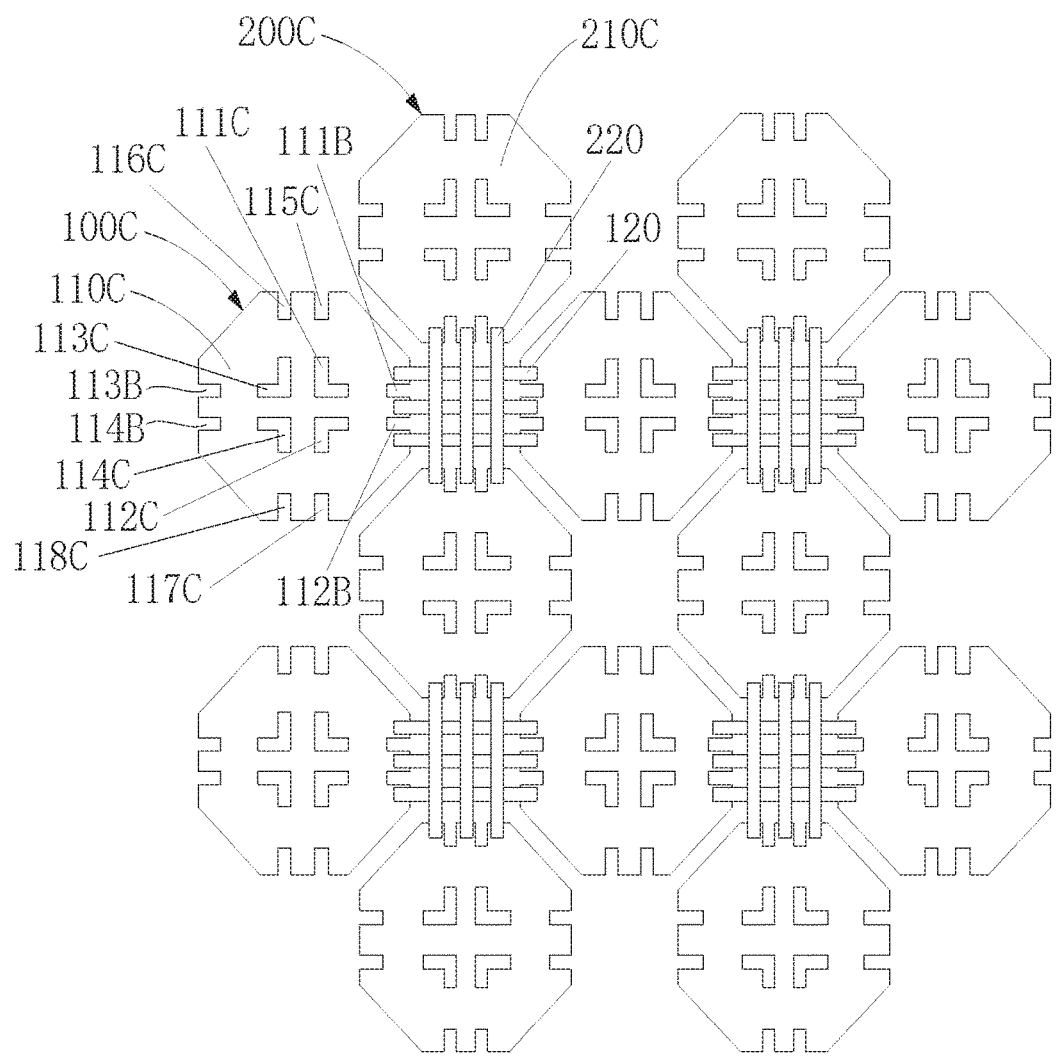
FIG. 4 is a structural schematic view of a touch structure for touch display panel according to yet another embodiment of the disclosure.

FIG. 4 is a structural schematic view of a touch structure for touch display panel according to yet another embodiment of the disclosure.

Please refer to FIG. 4, the difference between the FIG. 3 is that, in this embodiment, structure of the first sensing pad 110C and the second sensing pad 210C shows in FIG. 4 is difference between structure of the first sensing pad 110B and the second sensing pad 210B shows in FIG. 3.

Specifically, the first sensing pad 110C and the second sensing pad 210C have same structure, therefore here only illustrates the first sensing pad 110C.

Each of the first sensing pad 110C has a fifth channel 115C and a sixth channel 116C are opened along a third side of the octagon, and the fifth channel and the sixth channel are parallel to each other. And a seventh 117C channel and an eighth channel are 118C opened along a fourth side of the octagon, and the seventh channel 117C and the eighth channel 118C are parallel to each other. The third side is opposite to the fourth side, and the third side is not connecting with the first side and the second side, the fourth side is not connecting with the first side and the second side. The extending direction of the fifth channel 115C and the seventh channel 117C are coincidence and independent, extending direction of the sixth channel 116C and the eighth channel 118C are coincidence and independent.

Further, in order to enhance pattern design of the sensing pad, the first sensing pad 110C further comprises a first bending groove 111C, a second bending groove 112C, a third bending groove 113C and a fourth bending groove 114C, and there are array arrangement. The first bending groove 111C, the second bending groove 112C, the third bending groove 113C and the fourth bending groove 114C are L-shaped, and bending sites (which is L-shaped right angle) of the first bending groove 111C, the second bending groove 112C, the third bending groove 113C and the fourth bending groove 114C are corresponding to each other.

Further, the first bending groove 111C is corresponding to the first channel 111B, and extending direction of one groove of the first bending groove 111C is coincidence to extending direction of the first channel 111B, extending direction of another groove of the first bending groove 111C is coincidence to extending direction of the fifth channel 115C. The second bending groove 112C is corresponding to the second channel 112B, and extending direction of one groove of the second bending groove 112C is coincidence to extending direction of the second channel 112B, extending direction of another groove of the second bending groove 112C is coincidence to extending direction of the seventh channel 117C. The third bending groove 113C is corresponding to the third channel 113B, and extending direction of one groove of the third bending groove 113C is coincidence to extending direction of the third channel 113B, extending direction of another groove of the third bending groove 113C is coincidence to extending direction of the sixth channel 116C. The fourth bending groove 114C is corresponding to the fourth channel 114B, and extending direction of one groove of the fourth bending groove 114C is coincidence to extending direction of the fourth channel 114B, extending direction of another groove of the fourth bending groove 114C is coincidence to extending direction of the eighth channel 118C.

In sum, according to the embodiments of this disclosure, using multiple bridge connectors connecting in cascade with adjacent sensing pads could effective decrease risk of the broken circuit such that enhance connection yield of bridge connector. In addition, the small area design of the sensing pad could also enhances sensitivity of the touch reaction such increases user experience. Further, providing multiple pattern structures sensing pad is beneficial to product diversification.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A touch structure for touch display panel, comprising a plurality of first sensing strip, each of the first sensing strips is extending along a first direction and the plurality of the first sensing strip are parallel to each other and separately positioned, each of the first sensing strips comprises a plurality of first sensing pad and a plurality of first bridge connector connecting in cascade with the plurality of first sensing pad, two adjacent the first sensing pads of each of the first sensing strips connected in cascade with at least two of the first bridge connectors;

a plurality of second sensing strip, each of the second sensing strips is extending along a second direction which is perpendicular to the first direction and the plurality of the second sensing strip are parallel to each other and separately positioned, each of the second sensing strips comprises a plurality of second sensing pad and a plurality of second bridge connector connecting in cascade with the plurality of second sensing pad, two adjacent the second sensing pads of each of the first sensing strips connected in cascade with at least two of the second bridge connectors;

wherein each of the second sensing strips crosses to the plurality of the first sensing strips, each of the second bridge connectors crosses all of the first bridge connectors which are positioned between two adjacent correspondingly the first sensing pads, and an insulating body is disposed on an overlapping position of the second bridge connector and the first bridge connector;

wherein the first sensing pad and/or the second sensing pad is octagon, the first sensing pad has a first channel and a second channel are opened along a first side of the octagon and parallel to each other, and a third channel and a fourth channel are opened along a second side of the octagon and parallel to each other, the first side is opposite to the second side, extending direction of the first channel and the third channel are coincidence and independent, extending direction of the second channel and the fourth channel are coincidence and independent; and wherein the first sensing pad has a fifth channel and a sixth channel are opened along a third side of the octagon and parallel to each other, and a seventh channel and an eighth channel are opened along a fourth side of the octagon and parallel to each other, the third side is opposite to the fourth side, and the third side is not connecting with the first side and the second side, the fourth side is not connecting with the first side and the second side, extending direction of the fifth channel and the seventh channel are coincidence and independent, extending direction of the sixth channel and the eighth channel are coincidence and independent.

2. The touch structure for touch display panel according to claim 1, wherein the first sensing pad further comprises a first bending groove, a second bending groove, a third bending groove and a fourth bending groove are array arrangement, the first bending groove, the second bending groove, the third bending groove and the fourth bending groove are L-shaped, and bending sites of the first bending groove, the second bending groove, the third bending groove and the fourth bending groove are corresponding to each other.

3. The touch structure for touch display panel according to claim 2, wherein the first bending groove is corresponding to the first channel, and extending direction of one groove of the first bending groove is coincidence to extending direction of the first channel, extending direction of another groove of the first bending groove is coincidence to extending direction of the fifth channel;

the second bending groove is corresponding to the second channel, and extending direction of one groove of the second bending groove is coincidence to extending direction of the second channel, extending direction of another groove of the second bending groove is coincidence to extending direction of the seventh channel;

the third bending groove is corresponding to the third channel, and extending direction of one groove of the third bending groove is coincidence to extending direction of the third channel, extending direction of another groove of the third bending groove is coincidence to extending direction of the sixth channel;

the fourth bending groove is corresponding to the fourth channel, and extending direction of one groove of the fourth bending groove is coincidence to extending direction of the fourth channel, extending direction of another groove of the fourth bending groove is coincidence to extending direction of the eighth channel.

4. The touch structure for touch display panel according to claim 1, wherein in each of the first sensing strips, part of two adjacent first sensing pads which located between the first channel and the second channel is connecting in cascade with the first bridge connector, part of two adjacent first sensing pads which located on a side of the first channel which backward to the second channel is connecting cascade in with the first bridge connector, part of two adjacent first sensing pads which located on a side of the second channel which backward to the first channel is connecting cascade with the first bridge connector.

5. The touch structure for touch display panel according to claim 1, wherein the first sensing pad and the second sensing pad have same structures.

* * * * *